Nov. 22, 1955     S. M. KASS     2,724,404
INLET VALVE
Filed May 10, 1954
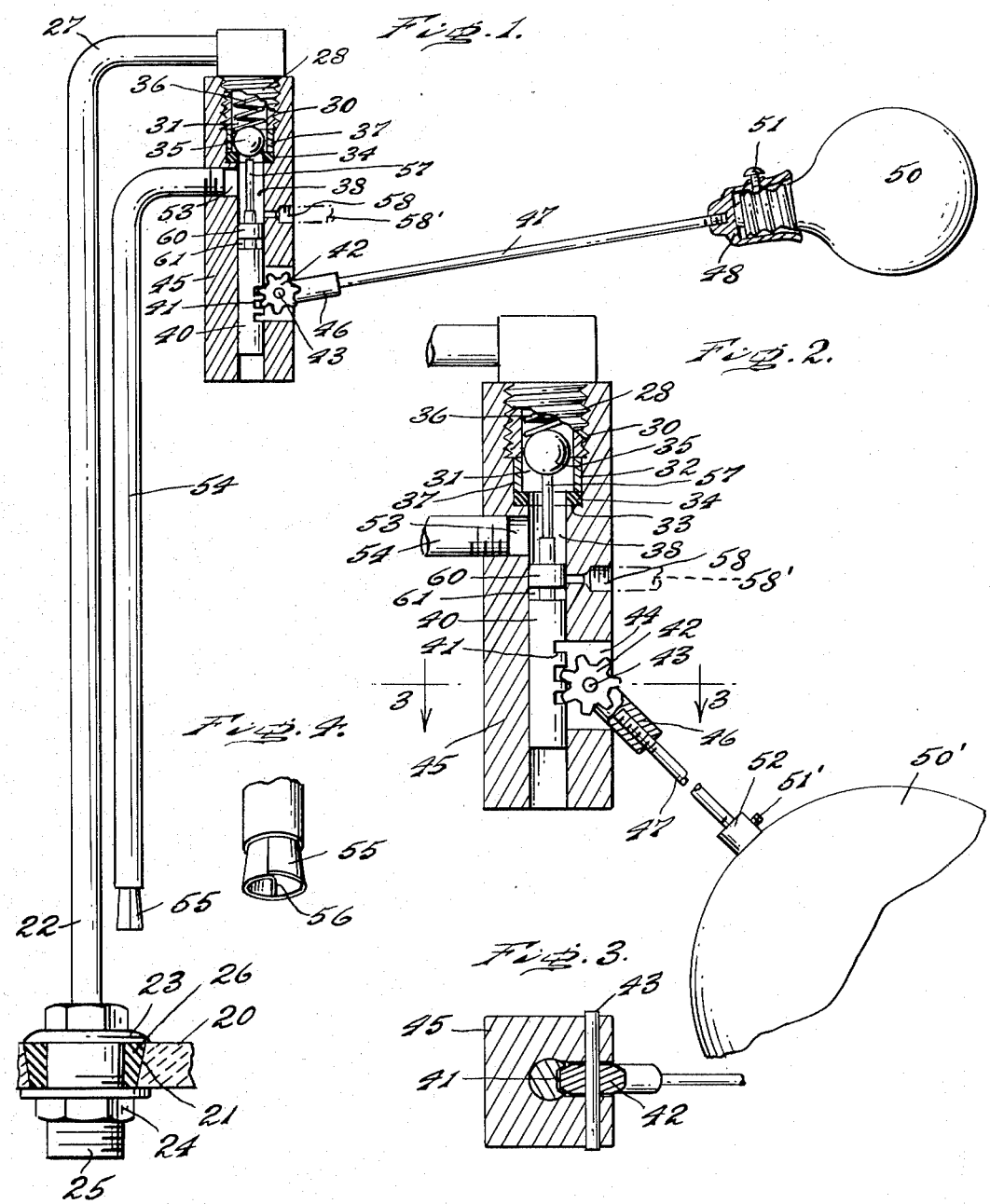
INVENTOR
Samuel M. Kass
BY
Wm. Steell Jackson and Sons
ATTORNEYS.

United States Patent Office 2,724,404
Patented Nov. 22, 1955

2,724,404
INLET VALVE

Samuel M. Kass, Philadelphia, Pa.

Application May 10, 1954, Serial No. 428,711

1 Claim. (Cl. 137—446)

The present invention relates to inlet valves of the type which are commonly employed in flush tanks.

A purpose of the invention is to provide a simple and inexpensive inlet valve which will be reliable in service.

A further purpose is to obtain more positive operation of an inlet valve.

A further purpose is to provide an overflow connection which is sealed when the inlet valve is open by action of the float.

A further purpose is to interconnect an operating plunger with a float by a rack and gear.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 1 is a central vertical section of the inlet valve of the invention.

Figure 2 is a fragmentary enlargement of Figure 1, showing a modification in the float.

Figure 3 is a section of Figure 1 on the line 3—3.

Figure 4 is a fragmentary perspective of the discharge port.

Describing in illustration but not in limitation and referring to the drawings:

In the prior art, inlet valves to flush tanks have caused considerable difficulty, particularly in respect to the action of operating cams and similar mechanism under the corrosive conditions present in the tank.

The present invention is designed to produce a simple and reliable inlet valve employing a ball which is operated by a rack and pinion.

The invention likewise contemplates having the plunger itself perform a valve function to close an overflow.

I illustrate in Figure 1 a flush tank wall 20, which has an opening 21 in which an inlet pipe 22 is sealed by a flange 23 and nut 24 acting on a threaded pipe 25 to tighten a gasket 26. The inlet pipe is bent at 27 at the top and connects with an inlet fitting 28 which is threaded at 30 into the inlet chamber 31 of an inlet valve. The inlet chamber has a bore 32 shouldered at 33 to receive a valve seat 34 suitably of rubber which is engaged by a ball valve 35 urged toward closure by a spiral compression spring 36 acting from the fitting 28. A collar 37 in the bore 32 is engaged by the end of the fitting and holds the seat in place.

Below the seat 34 there is a tubular cylindrical outlet chamber 38, in which a plunger 40 reciprocates. The plunger has a rack 41 which is engaged by a pinion 42 pivoted on pin 43 and operating in a window opening 44 at the side of valve housing 45. The pinion is rigidly connected to lever socket 46 which makes a threaded connection with float rod 47 which in the form of Figure 1 has secured at the outer end a socket 48 which engages a float suitably an electric light bulb 50. The bulb is held in place by a set screw 51 which engages the plug end.

In some cases it is preferred to use a standard metallic float 50' which is engaged on float rod 47 by collar 52 and set screw 51'.

The inlet chamber below the set has an opening 53 which receives discharge pipe 54 which extends to the bottom of the flush tank and is suitably fitted with a silent discharge nozzle 55 consisting of a sheet iron strip bent into conical form and having a transverse wall 56 extending longitudinally of the interior.

The plunger has at its upper end an operating finger 57 which extends through the opening in the seat and engages and displaces the ball in the position of Figure 2. A side opening 58 is connected to the outlet chamber and receives the threaded end of an overflow pipe 58'. The plunger has a sealing head 60 adjoining the base of the finger 57 and an annular recess 61 between the sealing head and the rack portion of the plunger.

When the float is up the ball valve is closed, the sealing head is below the outlet opening. When the float is down and the check valve is open the sealing head 60 moves up and closes the drain opening 58 so that all inlet water passes into the tank through the pipe 54. The recess 61 aids in preventing products of corrosion from binding around the sealing head.

In operation of the device, when the float is up the plunger is down and the valve is closed under the pressure of the spring and the inlet water. At this time any drip can discharge through the opening 58. When, on the other hand, the float is down as in Figure 2, the ball valve is displaced and water enters the inlet chamber, but the sealing head cuts off the overflow opening 58. The water entering the tank produces a minimum of noise due to the effect of the silencer at 55.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

A flush tank inlet valve comprising walls forming an inlet chamber, walls forming an outlet chamber, a valve seat separating the inlet chamber and outlet chamber, a ball valve in the inlet chamber in closed position engaging the seat, walls forming a discharge opening communicating with the flush tank overflow, and entering the valve at the end of the outlet chamber remote from the seat, a longitudinally removable plunger in the outlet chamber and having a finger on the end of the plunger adapted to engage and displace the ball, having a rack in the side of the plunger, having a sealing head between the rack and the finger which engages the wall of the valve, the sealing head in the closed position of the valve being located on the side of the discharge opening remote from the valve seat and the sealing head in the open position of the valve closing off the discharge opening, there being an angular recess between the sealing head and the rack, a gear pivotally mounted and meshing with the rack and a lever arm connected to the gear.

References Cited in the file of this patent

UNITED STATES PATENTS

| | | |
|---|---|---|
| 950,946 | Muhl | Mar. 1, 1910 |
| 1,476,029 | Black | Dec. 4, 1923 |
| 1,483,258 | Willman | Feb. 12, 1924 |